March 14, 1939.  E. WOODINGS  2,150,258
RAIL FASTENER
Filed Jan. 31, 1938
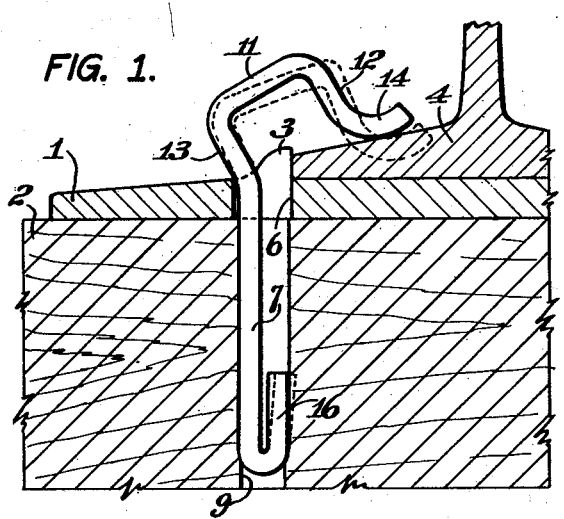
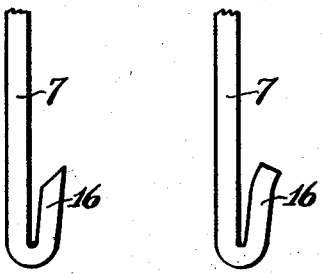
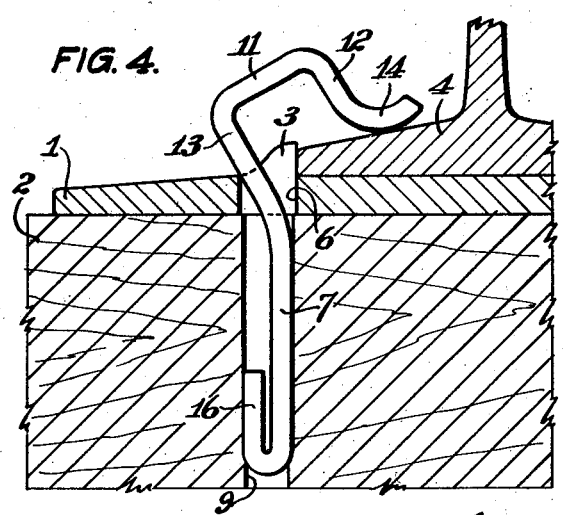
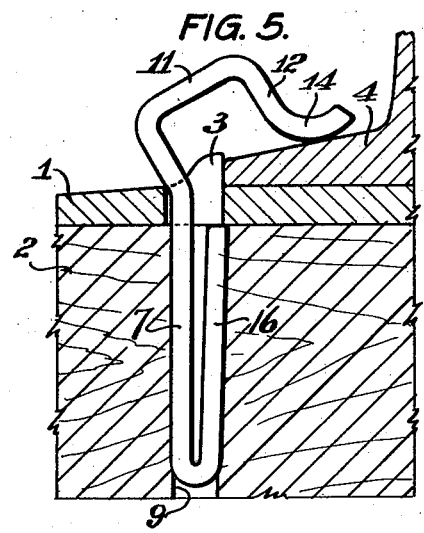
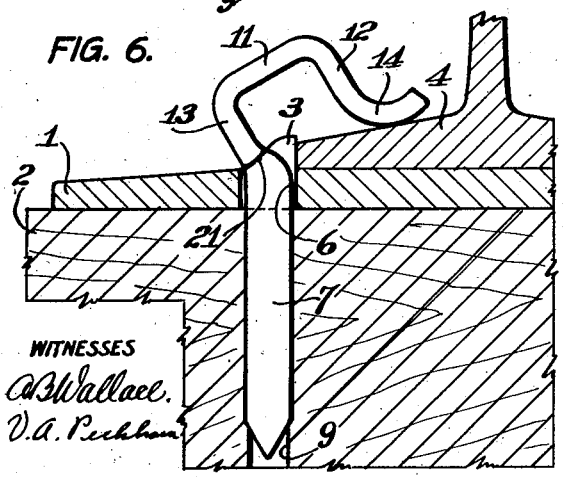
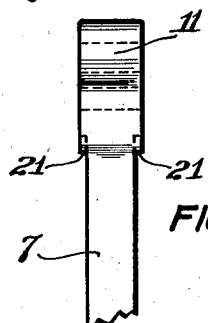
INVENTOR.
Emanuel Woodings
Brown, Critchlow & Flick
his ATTORNEYS.

Patented Mar. 14, 1939

2,150,258

UNITED STATES PATENT OFFICE 2,150,258

RAIL FASTENER

Emanuel Woodings, Oakmont, Pa., assignor to Woodings-Verona Tool Works, Verona, Pa., a corporation of Pennsylvania Application January 31, 1938, Serial No. 187,984

6 Claims. (Cl. 238—349)

This invention relates to fasteners for securing railroad rails in place on supporting cross ties.

It is among the objects of this invention to provide a rail fastener which is made in one piece, is inexpensive, durable, readily applied, is usable with an ordinary tie-plate, highly resistant to loosening, and which resiliently holds down the rail and serves as a creep check.

In accordance with this invention a railroad rail is held in place by a fastener that has a vertical shank secured in a cross tie. The upper end of the shank terminates in an integral extension in the form of an inverted U-shaped portion having substantially parallel legs projecting downwardly and inwardly. The lower end of the inner leg is curved inwardly toward the rail so as to bear against the top of the adjacent rail base flange. The extension or U-shaped portion is sufficiently resilient to permit its rail-engaging end to be distorted upwardly when the fastener is driven into place. The shape of the upper portion of the fastener is such that it provides a convenient driving head for the fastener. In one form of the invention the lower end of the upper portion of the fastener is provided with a shoulder for limiting downward movement of the fastener in the tie.

In another form of the invention the lower end of the shank is also provided with an integral extension which is bent sharply upwardly along the shank for any suitable distance. Preferably, the upper end of this upwardly projecting extension does not extend above the top of the tie. This extension projects upwardly and outwardly from the shank when the fastener is not in use so that when the fastener is put in place the extension is forced inwardly toward the shank and therefore exerts lateral pressure against the side of the fastener-receiving hole in the tie to resist withdrawal therefrom. The upper end of the extension can dig into the tie or abut against the bottom of the tie-plate for further hindering or preventing withdrawal of the fastener from the tie. These fasteners can be used with ordinary tie-plates and can take the place of spikes for securing the rail and tie-plate to the underlying cross tie. They also serve as very effective creep checks.

The invention is illustrated in the accompanying drawing in which Fig. 1 is a fragmentary cross-section through a rail, tie-plate and cross tie, showing my rail fastener in elevation; Figs. 2 and 3 are fragmentary side views of the lower portions of two different modifications of this invention; Figs. 4, 5 and 6 are views similar to Fig. 1 of three other modifications of this invention; and Fig. 7 is a fragmentary view of the fastener shown in Fig. 6 as seen from the left.

Referring to Fig. 1 of the drawing, a tie-plate 1 is mounted on top of a wooden cross tie 2, and is provided transversely of its upper surface with a rib 3 forming an integral shoulder that defines one side of a rail seat and prevents lateral movement in that direction of the rail base flanges 4 mounted on the seat. The tie-plate may be provided with the usual square spike holes 6 at the edges of the rail base.

In order to hold the rail down on its seat in accordance with this invention a rail fastener, preferably made in one piece from a bar bent to shape, is disposed in a tie-plate hole 6 with its shank 7 extending downwardly into the cross tie for securing the fastener in place. The shank is driven into position in the tie which has a preformed spike-receiving hole 9 therethrough for that purpose. The upper end of the shank terminates in an integral extension in the form of an inverted U-shaped portion 11 having substantially parallel inner and outer legs 12 and 13, respectively. These legs project downwardly and inwardly, and the lower end of the inner leg 12 is curved inwardly toward the rail to form a bearing portion 14 that engages the top of the adjacent rail base flange 4.

The fastener is most suitably made from a metal rod or bar having some resiliency, whereby when it is driven into the tie its rail-engaging portion 14 is distorted upwardly from its broken line position shown in Fig. 1 and biases the rail downwardly against its seat at all times. The resiliency of bearing portion 14 also permits the usual slight rise and fall of the rail without raising the fastener as a whole and thereby loosening it in the cross tie. The U-shaped portion 11 increases the resiliency of the fastener and distributes the distortion of bearing portion 14 over a greater area so that there is little likelihood of the fastener breaking. The shape of the upper portion of the fastener and its location relative to the shank provide a driving head for the fastener and tend to limit the distance that the shank can be driven into the tie so that the fastener will not be overstressed.

The lower end of the shank is also provided with an extension 16 that is bent sharply upwardly along the shank on either side, as shown in Figs. 1 and 4. The fastener is so formed that the shank and extension 16 diverge upwardly when the fastener is not in operative position. When the fastener is driven into a tie, as in Fig. 1, extension 16 is forced inwardly toward the shank from its broken line position, but the resiliency of the bar from which the fastener is formed causes the shank and adjacent extension to bias themselves away from each other and against the wall of the hole in the tie, whereby the fastener is more securely held in the tie. The upper end of extension 16 may even cut into the tie and thereby positively lock the fastener in position.

To insure that extension 16 will dig into the tie, its upper end may be beveled to form a point as shown in Fig. 2, or may be turned slightly outwardly as shown in Fig. 3.

In the modification shown in Fig. 5 a still more positive lock is formed by extending extension 16 upwardly so that its upper end is positioned at substantially the top of the tie. The tendency of this extension to spring away from the shank causes its upper end to press into the tie and abut against the bottom of the tie-plate.

The embodiment of the invention disclosed in Figs. 6 and 7 is provided with the same type of U-shaped upper portion 11 as the preceding embodiments, but the shank is in the shape of a railroad spike that fills the hole in the tie. This fastener is preferably made by forging one end of a metal bar, corresponding in cross-sectional size and shape to a railroad spike, to thin and widen the end portion of the bar. This end portion is then bent into the shape of the U-shaped upper portion of the fastener shown in Fig. 6. At the junction of the shank and the widened upper portion of the fastener shoulders 21 are formed. As the shank of the fastener is substantially as wide as the hole in the tie-plate in which it is disposed, these shoulders overlie the tie-plate at the edge of the hole and thereby positively limit the distance that the fastener can be driven down into the tie.

These fasteners also serve as creep checks because they securely grip the rail at all times. Their holding or checking ability is increased by providing their rail-engaging faces with transversely flat bearing surfaces.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A rail fastener having a vertical shank adapted to be secured in a cross tie and terminating at its upper end in an integral extension in the form of an inverted U-shaped portion having substantially parallel legs projecting downwardly and inwardly, the lower end of the inner leg being curved inwardly toward the rail and adapted to bear against the top of the adjacent rail base flange and to be distorted upwardly thereby when the fastener is driven into place, and the lower end of said shank being provided with an integral extension bent sharply upwardly along the shank and terminating below the top of said cross tie.

2. A rail fastener having a vertical shank adapted to be secured in a cross tie and terminating at its upper end in an integral extension in the form of an inverted U-shaped portion having substantially parallel legs projecting downwardly and inwardly, the lower end of the inner leg being curved inwardly toward the rail and adapted to bear against the top of the adjacent rail base flange and to be distorted upwardly thereby when the fastener is driven into place, and the lower end of said shank being provided with an integral extension bent sharply upwardly along the shank, and terminating substantially at the upper surface of said cross tie, said latter extension being biased outwardly whereby its upper end is adapted to abut against the bottom of the tie-plate.

3. A rail fastener having a vertical shank adapted to be secured in a cross tie and terminating at its upper end in an integral extension in the form of an inverted U-shaped portion having substantially parallel legs projecting downwardly and inwardly, the lower end of the inner leg being curved inwardly toward the rail and adapted to bear against the top of the adjacent rail base flange and to be distorted upwardly thereby when the fastener is driven into place, and the lower end of said shank being provided with an integral extension bent sharply upwardly along the shank and terminating below the top of said cross tie, the upper end of said latter extension being beveled upwardly and outwardly to form an edge adapted to dig into said cross tie to prevent withdrawal of the fastener from the tie.

4. A rail fastener having a vertical shank adapted to be secured in a cross tie and terminating at its upper end in an integral extension projecting laterally for engaging the top of the adjacent rail base flange, and the lower end of said shank being provided with an integral extension bent sharply upwardly along the shank and terminating below the top of said cross tie.

5. A rail fastener having a vertical shank adapted to be secured in a cross tie and terminating at its upper end in an integral extension projecting laterally for engaging the top of the adjacent rail base flange, and the lower end of said shank being provided with an integral extension bent sharply upwardly along the shank, and terminating substantially at the upper surface of said cross tie, said latter extension being biased outwardly whereby its upper end is adapted to abut against the bottom of the tie plate.

6. A rail fastener having a vertical shank adapted to be secured in a cross tie and terminating at its upper end in an integral extension projecting laterally for engaging the top of the adjacent rail base flange, and the lower end of said shank being provided with an integral extension bent sharply upwardly along the shank and terminating below the top of said cross tie, the upper end of said latter extension being beveled upwardly and outwardly to form an edge adapted to dig into said cross tie to prevent withdrawal of the fastener from the tie.

EMANUEL WOODINGS.